(12) United States Patent
Behmer et al.

(10) Patent No.: US 12,163,502 B2
(45) Date of Patent: Dec. 10, 2024

(54) LEADING EDGE PROTECTION FOR A WIND TURBINE BLADE

(71) Applicants: BLADE DYNAMICS LIMITED, Eastleigh (GB); LM WIND POWER A/S, Kolding (DK); GENERAL ELECTRIC RENOVABLES ESPANA, S.L., Barcelona (ES); LM WIND POWER (HOLLAND) B.V., Heerhugowaard (NL)

(72) Inventors: Harald Behmer, Eastleigh (GB); Horacio Bulacio, Kolding (DK); Marc Canal Vila, Barcelona (ES); Michael Drachmann Haag, Kolding (DK); Andreas Herrig, Salzbergen (DE); Jordy Hertel Nilsson Van Kalken, Kolding (DK); Hans Minnee, Heerhugowaard (NL)

(73) Assignees: BLADE DYNAMICS LIMITED, Eastleigh Hampshire (GB); LM WIND POWER A/S, Kolding (DK); GENERAL ELECTRIC RENOVABLES ESPANA, S.L., Barcelona (ES); LM WIND POWER (HOLLAND) B.V., Heerhugowaard (NL)

( * ) Notice: Subject to any disclaimer, the term of this patent is extended or adjusted under 35 U.S.C. 154(b) by 0 days.

(21) Appl. No.: 17/924,483

(22) PCT Filed: May 11, 2021

(86) PCT No.: PCT/EP2021/062475
§ 371 (c)(1),
(2) Date: Nov. 10, 2022

(87) PCT Pub. No.: WO2021/228851
PCT Pub. Date: Nov. 18, 2021

(65) Prior Publication Data
US 2023/0184208 A1 Jun. 15, 2023

(30) Foreign Application Priority Data
May 11, 2020 (GB) .................................. 2006879

(51) Int. Cl.
*F03D 1/06* (2006.01)
(52) U.S. Cl.
CPC ...... *F03D 1/0675* (2013.01); *F05B 2240/303* (2020.08)
(58) Field of Classification Search
CPC ........ F03D 1/0675; F03D 80/30; F03D 80/40; F03D 80/401; F03D 80/60; F03D 80/602; F05B 2240/303; F05B 260/20
See application file for complete search history.

(56) References Cited

U.S. PATENT DOCUMENTS

| | | | |
|---|---|---|---|
| 11,333,127 B2 * | 5/2022 | Kratmann | F03D 1/0675 |
| 2011/0038729 A1 * | 2/2011 | Shymanski | F03D 80/40 |
| | | | 416/95 |

(Continued)

FOREIGN PATENT DOCUMENTS

| | | |
|---|---|---|
| PL | 230525 B1 | 12/2016 |
| WO | 2017198267 A1 | 11/2017 |

(Continued)

OTHER PUBLICATIONS

Machine translation of WO 2018/157929 A1, Retrieved from Espacenet on Oct. 17, 2023 (Year: 2023).*

Primary Examiner — Sang K Kim
(74) Attorney, Agent, or Firm — Nath, Goldberg & Meyer; Tanya E. Harkins

(57) ABSTRACT

A wind turbine blade includes a leading edge protection element attached to the leading edge of the wind turbine (Continued)

blade. The leading edge protection element extends in a longitudinal direction between an outboard end and an inboard end and includes an attachment surface mounted to an exterior surface of the blade, an exterior surface opposite the attachment surface, a first section extending from the leading edge and along a part of the pressure side of the wind turbine blade to a first transverse end at a first position on the pressure side of the blade, and a second section extending from the leading edge and along a part of the suction side of the wind turbine blade to a second transverse end at a second position on the suction side of the blade.

18 Claims, 8 Drawing Sheets

(56) References Cited

U.S. PATENT DOCUMENTS

| 2020/0011300 | A1 | 1/2020 | Fujioka et al. | |
|---|---|---|---|---|
| 2020/0232445 | A1* | 7/2020 | Lindskog | B29C 73/34 |
| 2023/0287863 | A1* | 9/2023 | Herrig | F03D 1/0675 |
| | | | | 416/223 R |

FOREIGN PATENT DOCUMENTS

| WO | 2018157929 A1 | 9/2018 |
|---|---|---|
| WO | 2019015372 A1 | 1/2019 |

\* cited by examiner

LEADING EDGE PROTECTION FOR A WIND TURBINE BLADE

This is a National Phase Application filed under 35 U.S.C. 371 as a national stage of PCT/EP2021/062475, filed May 11, 2021, an application claiming the benefit of Great Britian Application No. 2006879.7, filed May 11, 2020, the content of each of which is hereby incorporated by reference in its entirety.

The present disclosure relates to wind turbine blades and manufacture of wind turbine blades. More specifically, the present disclosure pertains to the field of protection of wind turbine blades against environmental influence, such as protection of the leading edge of wind turbine blades.

BACKGROUND

Wind turbines need to be designed for operation for several years, e.g. at least 20 years. To maximise the annual energy production (AEP), it is important that the down-time of the wind turbine is minimised and intended AEP during use is maximised. During operation the airfoil in the outboard region of the blade where critical erosion inset velocities are exceeded is subject to increased wear caused by impact of particles in the air. To reduce the wear and erosion on the leading edge there is a need for a robust material on the wind turbine blade, and especially the leading edge where particles in the air impact the blade at high speed due to the blade trajectories in operation.

Wind turbine blades may be repaired to increase the life span and/or to reduce the erosion damage in the leading edge area. However, this goes against the requirements of minimising down-time. Further, it is difficult and costly to repair wind turbines, in particular offshore wind turbines. As an alternative or supplement, a protective element may be attached to the leading edge, e.g. the erosion sensitive area of the wind turbine blade. However, the shape and the location of the protective element has a large impact on the drag, lift and noise of the blade, which in turn also may influence the AEP.

The tip of the wind turbine blade travels with the highest velocity and the leading edge near the tip is therefore subject to most wear. Therefore, it may be sufficient to apply the leading edge protection element to only a part of the leading edge towards the tip of the wind turbine blade.

SUMMARY OF THE INVENTION

It is an object of the present disclosure to provide a leading edge protection element and a leading edge portion of a wind turbine blade which overcomes or ameliorates at least some of the disadvantages of the prior art.

In particular, it is an object of the present invention to provide a method for protecting a leading edge of a wind turbine blade, which improves the robustness, e.g. against erosion, of wind turbine blades while reducing the impact on the aerodynamic efficiency. Improvement in the robustness of the wind turbine blade may further prolong the life span of the individual wind turbine blades. In addition to prolonged life span of wind turbine blades the present invention provides a higher annual energy production by reducing the drag and increasing the lift of the wind turbine blade by optimizing the placement of a leading edge protection element.

Thus, the present invention relates to a wind turbine blade extending from a root to a tip, the wind turbine blade comprising a root region, and an airfoil region comprising the tip, a pressure side, a suction side and a chord line extending between a leading edge and a trailing edge.

The wind turbine blade comprises a leading edge protection element attached to the leading edge of the wind turbine blade. The leading edge protection element extends in a longitudinal direction between an outboard end and an inboard end. The leading edge protection element has a length between the outboard end and the inboard end.

The leading edge protection element comprises an attachment surface mounted to an exterior surface of the blade. The leading edge protection element comprises an exterior surface opposite the attachment surface. The leading edge protection element comprises a first section extending from the leading edge and along a part of the pressure side of the wind turbine blade to a first transverse end at a first position on the pressure side of the blade. The first section has a first extent from the leading edge of the wind turbine blade, e.g. from the end of the chord line at the leading edge, to the first position on the pressure side of the blade. The leading edge protection element comprises a second section extending from the leading edge and along a part of the suction side of the wind turbine blade to a second transverse end at a second position on the suction side of the blade. The second section has a second extent from the leading edge of the wind turbine blade, e.g. from the end of the chord line at the leading edge, to the second position on the suction side of the blade.

The second extent is larger than the first extent along at least an inboard portion of the leading edge protection element. The first extent may be smaller than the second extent along at least an inboard portion of the leading edge protection element.

It is an advantage of the present disclosure that a better protection of a wind turbine blade is provided due to the robust leading edge protection element. It is a further advantage of the present disclosure that a higher annual energy production is provided by reducing the drag and increasing the lift of the wind turbine blade by extending the extent of the leading edge protection element on the suction side and thus postponing the transition from laminar to turbulent flow of the boundary layer in flow direction on the suction side. In fact, the annual energy production proved to be surprisingly higher than expected. In addition, noise may be reduced.

Extending the extent of the leading edge protection element on the suction side has a larger impact on the overall performance due to larger flow velocities and a skin friction drag fraction on the suction side. Thus, the drag and noise performance are more sensitive to changes in transition location on the suction side than the transition location on the pressure side so the location on the suction side may result in better performance if optimized.

Also disclosed is a method for protecting a leading edge of a wind turbine blade.

The method comprises providing a wind turbine blade. The wind turbine blade extends from a root to a tip, and comprising a root region, and an airfoil region comprising the tip, a pressure side, a suction side and a chord line extending between the leading edge and a trailing edge.

A leading edge protection element is provided. The leading edge protection element extends in a longitudinal direction between an outboard end and an inboard end. The leading edge protection element has a length between the outboard end and the inboard end. The leading edge protection element comprises an attachment surface mounted to an exterior surface of the blade. The leading edge protection element comprises an exterior surface opposite the attachment surface. The leading edge protection element comprises a first section configured to extend from the leading edge and along a part of the pressure side of the wind turbine blade to a first transverse end at a first position on the pressure side of the blade. The leading edge protection element comprises a second section configured to extend from the leading edge and along a part of the suction side of the wind turbine blade to a second transverse end at a second position on the suction side of the blade.

The leading edge protection element may be attached to the wind turbine blade such that the first section has a first extent from the leading edge of the wind turbine blade to the first position on the pressure side of the blade. The leading edge protection element may be attached to the wind turbine blade such that the second section has a second extent from the leading edge of the wind turbine blade to the second position on the suction side of the blade.

The second extent may be larger than the first extent along at least an inboard portion of the leading edge protection element.

The leading edge protection element may be attached such that the outboard end of the leading edge protection element is proximate the tip of the wind turbine blade. The leading edge protection element may be provided with a protective layer attached to the attachment surface. The protective layer may be removed in portions before attaching the leading edge protection element to the leading edge of the wind turbine blade. The protective layer may be of a combination of paper and plastic material.

The leading edge protection element may be attached such that the inboard end of the leading edge protection element is proximate the root of the wind turbine blade.

According to another aspect of the invention, a leading edge protection element for a wind turbine blade is provided. The leading edge protection element extends in a longitudinal direction and has a length between an outboard end and an inboard end.

The leading edge protection element comprises an attachment surface configured to be mounted to an exterior surface of a wind turbine blade.

The leading edge protection element comprises a first section extending from a leading edge line to a first transverse end and having a first extent from the leading edge line to the first transverse send. The leading edge line is configured to be aligned with a leading edge of the blade. The first section is configured to extend along a part of a pressure side of the blade and the first transverse end is configured to be aligned with a first position on the pressure side of the blade.

The leading edge protection element comprises a second section extending from the leading edge line to a second transverse end and having a second extent from the leading edge line to the second transverse send. The second section is configured to extend along a part of a suction side of the blade. The second transverse end is configured to be aligned with a second position on the suction side of the blade.

The second extent is larger than the first extent along at least an inboard portion of the leading edge protection element and wherein the second extent is smaller than the first extent along at least an outboard portion of the leading edge protection element.

In another aspect of the invention, a leading edge protection element for a wind turbine blade is provided. The leading edge protection element extends in a longitudinal direction and has a length between an outboard end and an inboard end.

The leading edge protection element comprises an attachment surface configured to be mounted to an exterior surface of a wind turbine blade.

The leading edge protection element comprises a first section extending from a leading edge line to a first transverse end and having a first extent from the leading edge line to the first transverse send. The leading edge line is configured to be aligned with a leading edge of the blade. The first section is configured to extend along a part of a pressure side of the blade and the first transverse end is configured to be aligned with a first position on the pressure side of the blade.

The leading edge protection element comprises a second section extending from the leading edge line to a second transverse end and having a second extent from the leading edge line to the second transverse send. The second section is configured to extend along a part of a suction side of the blade. The second transverse end is configured to be aligned with a second position on the suction side of the blade The second extent is larger than the first extent along at least an inboard portion of the leading edge protection element.

A further advantage of the present invention is a leading edge protection element with a wide range of application. The leading edge protection element is easy to handle due to the elastic material and the strong adhesive provided. The elasticity of the material provides a more flexible leading edge protection element, which is easier to attach a leading edge. The leading edge protection element may be manipulated during attachment, e.g., stretched to accommodate the double-curvatures of the leading edge of the blade and to reduce wrinkles during attachment. The strong adhesive will remain strong even when the leading edge protection element is manipulated. The outboard portion of the leading edge protection element may be manipulated. The outboard portion may be stretched between 3-10%, such as between 5-8%, of its length in the longitudinal direction. The outboard portion may be between 0.5-1.5 m in the longitudinal direction.

The leading edge protection element may be a film or a sheet. The leading edge protection element may be applied in a liquid form, e.g. as a paint.

The leading edge protection element may be attached to the leading edge of a newly manufactured wind turbine blade, a wind turbine blade during service or a wind turbine blade that needs repair, e.g. due to flaking or erosion of the existing leading edge protection element. The leading edge protection element may be cut into smaller pieces for easier repair of local damages of the existing leading edge protection.

During repair, the existing leading edge protection element may be removed partly or wholly, e.g., by sanding or rubbing. The existing leading edge protection element may be removed locally. The leading edge protection element of the present invention may be cut into smaller pieces, e.g., patches or strips, adapted to the size of the location for repair. Thus, a faster and easier repair for leading edge protection elements is provided.

Due to the elasticity of the leading edge protection element of the present invention, attachment is easier and better adaption to the different curvatures of blade is provided.

The attachment surface of the leading edge protection element and the leading edge of the wind turbine blade may be joined by use of an adhesive, e.g. a pressure sensitive adhesive or a two component adhesive and/or a heat activated adhesive. The adhesive may be applied on the attachment surface of the leading edge protection element and/or on a portion of the leading edge of the wind turbine blade. Alternatively, the leading edge protection element and the leading edge of the wind turbine blade may be attached with an adhesive film or sheet. The adhesive may be a pressure, heat or UV-activated adhesive. The adhesive may be a pressure sensitive acrylic adhesive. The adhesive may be a thermosetting film and/or an epoxy prepreg film. The adhesive may be in a liquid form. Alternatively, the leading edge protection element may be welded, riveted or bolted onto the wind turbine blade.

Alternatively, the leading edge protection element may have a liquid form and be coated onto the leading edge of the wind turbine blade. The exterior surface of the leading edge protection element may be coated with another leading edge protection element having a liquid form. The coated leading edge protection element may be cured on the wind turbine blade. In this case additional adhesive may not be needed.

The first extent and/or the second extent may be measured in the chordal direction, e.g. chordwise direction. The first and/or the second extent may be measured along the chord line starting from the leading edge. Alternatively, the extent may be measured in the circumferential direction, e.g. along the outer surface of the blade shell parts, e.g. the extent may be expressed as the arc length.

The first position may be located at the boundary of the erosion sensitive area of the wind turbine blade in the inboard portion. The second position may be located beyond the boundary of the erosion sensitive area of the wind turbine blade in the inboard portion.

The first position may be located beyond the boundary of the erosion sensitive area of the wind turbine blade in the outboard portion. The second position may be located at the boundary or beyond the boundary of the erosion sensitive area of the wind turbine blade in the outboard portion.

The outboard end may be arranged proximal the tip of the wind turbine blade, e.g. the outboard end may be arranged at the tip of the wind turbine blade. The inboard end may be arranged proximal the root of the wind turbine blade.

The leading edge protection element may have a length between 15-30% of the length of the wind turbine blade, such as between 20-25% of the length of the wind turbine blade. The length may be between 10-100 m, such as between 15-70 m, such as between 20-50 m. The length may be smaller than the length of the leading edge of the wind turbine blade or the length may be the same as the length of the leading edge of the wind turbine blade.

The inboard portion of the leading edge protection element may extend in a longitudinal direction between 2-100% of the length of the leading edge protection element, such as between 5-80% of the length of the leading edge protection element, such as at least 50% of the length of the leading edge protection element. The inboard portion of the leading edge protection element may extend in a longitudinal direction less than 100% of the length of the leading edge protection element.

The leading edge protection element may be arranged on the wind turbine blade such that the inboard portion of the leading edge protection element is proximal the root, e.g. the root end, of the wind turbine blade. The leading edge protection element may thus have an inboard portion proximal the root of the wind turbine blade where the second extent on the suction side is larger than the first extent on the pressure side.

The ratio between the first extent and the second extent may be between 1:3-1:6, e.g. the second extent may be between 3-6 times longer than the first extent. The first extent and/or the second extent may be measured along the chord line starting from the leading edge.

The second extent may be smaller than the first extent along at least an outboard portion of the leading edge protection element. The leading edge protection element may be arranged on the wind turbine blade such that outboard portion of the leading edge protection element is proximal the tip of the wind turbine blade. The leading edge protection element may thus have an outboard portion proximal the tip where the first extent on the pressure side is larger than the second extent on the suction side. The leading edge protection element may be arranged such that the outboard portion of the leading edge protection element starts extending from the tip, e.g. tip end, of the wind turbine blade.

The second extent may be smaller than the first extent along at least an inboard portion of the leading edge protection element.

The second section may extend, e.g. in a chordwise direction, along at least 20% of the chord line of the wind turbine blade along at least the inboard portion of the leading edge protection element, such as at least 30% of the chord line of the wind turbine blade, such as at least 50% of the chord line of the wind turbine blade. For example, the second section may have an extent between 40-45% of the chord line of the wind turbine blade along at least a longitudinal portion of the leading edge protection element, such as the inboard portion.

The second section may extend along at least 30% of the chord line of the wind turbine blade along at least the outboard portion of the leading edge protection element, such as at least 40% of the chord line of the wind turbine blade, such as at least 50% of the chord line of the wind turbine blade.

The first section may extend, e.g. in the chordwise direction, along at least 5% of the chord line of the wind turbine blade along at least the inboard portion of the leading edge protection element, such as at least 15% of the chord line of the wind turbine blade, such as at least 30% of the chord line of the wind turbine blade.

The first section may extend, e.g. in the chordwise direction, along at least 20% of the chord line of the wind turbine blade along at least the outboard portion of the leading edge protection element, such as at least 40% of the chord line of the wind turbine blade, such as at least 70% of the chord line of the wind turbine blade.

The first extent and the second extent may have a total extent between 260-1200 mm, such as between 300-850 mm, such as around 400 mm, such as around 800 mm. The total extent may be measured in the chord wise direction or in the arc length direction of the wind turbine blade. The total extent may increase between the outboard end to the inboard end, such as along at least the outboard portion. For example, the outboard portion may have a substantially triangular or trapezoidal shape. The outboard portion may have a substantially right-angled triangular shape. The outboard portion may be configured to be asymmetrical about the leading edge.

The leading edge protection element may have a substantially triangular or trapezoidal shape, wherein the width between the first transverse end and the second transverse end, i.e., in the spanwise direction, may increase from the outboard end to the inboard end. The width may increase linearly. The width may increase linearly when the leading edge protection element is attached to the wind turbine blade. The leading edge protection element may be configured as a foil. The leading edge protection may be cut using a CNC laser cutter, a water jet, an ultrasonic knife or cut using a "stamp" or scissor-like tool. The leading edge protection element may be cut to have other shapes than triangular or trapezoidal. For example, the first transverse end or the second transverse end may follow a curved line.

The total extent may be constant along at least between the outboard end to the inboard end, such as along at least the inboard portion. For example, the inboard portion may have a substantially rectangular shape. The total extent of the inboard portion may be larger than the total extent of the outboard portion. For example, the total extent of the inboard portion may be around 800 mm at maximum and the total extent of the outboard portion may be 400 mm at maximum. A chordal distance between the first transverse end and the second transverse end may increase from the outboard end to the inboard end, such as along at least the inboard portion and/or the outboard portion.

The thickness of the leading edge protection element may be between 0.1-5.0 mm, such as between 0.3-1.5 mm, at a third position on the leading edge of the wind turbine blade. The leading edge protection element may have the largest thickness at the third position.

At least one of an end portion of the first section and an end portion of the second section may be chamfered. The ratio between the thickness of the leading edge protection element at the end portions and the thickest point of the leading edge protection element may be at least 1:20. The thickness of the end portions may preferably be less than 0.1 mm.

At least one of an end portion at the outboard end and an end portion at the inboard end may be chamfered. The ratio between the thickness at the end portions and the thickest point of the leading edge protection element may be 1:10. The thickness of the end portions may be around 0.30 mm.

The chamfered end portions provide a smoother transition from the leading edge protection element to the blade shell parts. At least one of the end portion at the outboard end, the end portion at the inboard end, the end portion of the first section and the end portion of the second section may be tapered.

One or more of the end portions may not be chamfered, e.g. the thickness of the leading edge protection element may be constant of uniform.

The end portion at the outboard end may be chamfered while the end portion at the inboard end may not be chamfered. The first end portion and/or the second end portion may be partially chamfered.

The second end portion may be chamfered over a longer length in the longitudinal direction than the length the first end portion is chamfered in the longitudinal direction. For example, the second end portion, e.g., on the suction side, may be chamfered along between 10-90% of the length of the leading edge protection element starting from the outboard end, such as along between 20-60%. The first end portion, e.g., on the pressure side, may be chamfered along between 5-70% of the length of the leading edge protection element starting from the outboard end, such as along between 15-50%.

The second end portion, e.g., on the suction side, may be chamfered between 10-90% of the of the length of the leading edge protection element starting from the outboard end, while the first end portion, e.g., on the pressure side, may be chamfered between 5-70% of the length of the leading edge protection element starting from the outboard end.

The second end portion, e.g., on the suction side, may be chamfered less than 60% of the length of the leading edge protection element starting from the outboard end, while the first end portion, e.g., on the pressure side, may be chamfered less than 30% of the length of the leading edge protection element starting from the outboard end.

The first end portion, e.g. on the pressure side, may be partially chamfered between 5-15% starting from the inboard end.

Providing a leading edge protection element with an asymmetric arrangement on the leading edge of a wind turbine blade reduces the effects that may be caused by non-chamfered or insufficiently chamfered end portions. Partial chamfering may provide higher drag values of the wind turbine blade and reduce low clean drag coefficients at a low lift, which may improve aerodynamic damping and stability during normal operation or in some standstill operation cases of the wind turbine blade. Furthermore, chamfering of the leading edge protection element is time consuming, thus, chamfering only part of the leading edge protection element reduces manufacturing time and costs.

The leading edge protection element may be divided into a plurality of parts extending along separate longitudinal parts of the wind turbine blade. The plurality of parts may abut one another, e.g. touch one another, or the parts may be separated by a distance, e.g. creating a joint area. One of the parts comprise the outbound portion and another one of the parts may comprise the inboard portion.

The plurality of parts of the leading edge protection element may have a rounded outboard end and a rounded inboard end. The joint area between two parts may be covered by a butt-strap element, such as a butt-strap strip, such as an adhesive butt-strap strip. The butt-straps may extend across the joint area and extend over at least a section of the parts.

The transition from an outboard configuration at an outboard portion of the leading edge protection element to an inboard configuration at an inboard portion of the leading edge protection element may be gradual or smooth.

The transition from an outboard configuration at an outboard portion of the leading edge protection element to an inboard configuration at an inboard portion of the leading edge protection element may jump in discrete intervals.

The transition from the inboard portion to the outboard portion may be gradual or smooth. The second extent at the outboard end of the inboard portion may be the same as the second extent at the inboard end of the outboard portion. The first extent at the outboard end of the inboard portion may be the same as the first extent at the inboard end of the outboard portion.

The transition from the inboard portion to the outboard portion may be sharp, hard, jagged or jump in discrete intervals. The second extent at the outboard end of the inboard portion may be different than the second extent at the inboard end of the outboard portion. The first extent at the outboard end of the inboard portion may be different than the first extent at the inboard end of the outboard portion.

For example, the second extent at the outboard end of the inboard portion may be smaller than the second extent at the inboard end of the outboard portion while the first extent at the outboard end of the inboard portion may be larger than the first extent at the inboard end of the outboard portion. The second extent at the outboard end at the inboard portion may be the larger than the second extent at the inboard end of the outboard portion while the first extent at the outboard end of the inboard portion may be smaller than the first extent at the inboard end of the outboard portion. The second extent at the outboard end of the inboard portion may be the larger than the second extent at the inboard end of the outboard portion while the first extent at the outboard end of the inboard portion may be larger than the first extent at the inboard end of the outboard portion. The second extent at the outboard end of the inboard portion may be the smaller than the second extent at the inboard end of the outboard portion while the first extent at the outboard end of the inboard portion may be smaller than the first extent at the inboard end of the outboard portion.

Alternatively, the transition from the inboard portion to the outboard portion may be smooth on one side, e.g., the pressure side, while the transition on the other side, e.g. the suction side, may be sharp, hard or ragged. The transition from the inboard portion to the outboard portion may be smooth on one side, e.g., the suction side, while the transition on the other side, e.g. the pressure side, may be sharp, hard or ragged.

The point where the first transverse end of the inboard portion and the inboard end of the inboard portion meet may form a sharp corner or a rounded corner. The point where the second transverse end of the inboard portion and the inboard end of the inboard portion meet may form a sharp corner or a rounded corner.

The length may be the sum of the length of each of the plurality of parts of the leading edge protection element.

The leading edge protection element may be made of a thermoplastic polyurethane (TPU), polyurethane, polyvinylchloride, polyethylene, silicone RTV, or other special polymeric materials, or metal materials with a flexible property, such as steel or nickel alloys.

The leading edge protection element may be made of an elastomeric and resilient polymer material, such as the material described above. The material may have a Shore A indentation hardness of between 70-90. The Shore A hardness may be measured according to measurements under DIN ISO 7619-1. The measurement may be made at a centre point of the measured material.

The entire leading edge protection element may comprise the same material. The leading edge protection element may be provided as a tape or a sheet.

In another aspect of the invention, the leading edge protection element may comprise any combination of the features disclosed in the afore-mentioned embodiments.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiment even if not so illustrated, or if not so explicitly described.

DETAILED DESCRIPTION

In the following figure description, the same reference numbers refer to the same elements and may thus not be described in relation to all figures.

Figure 1:
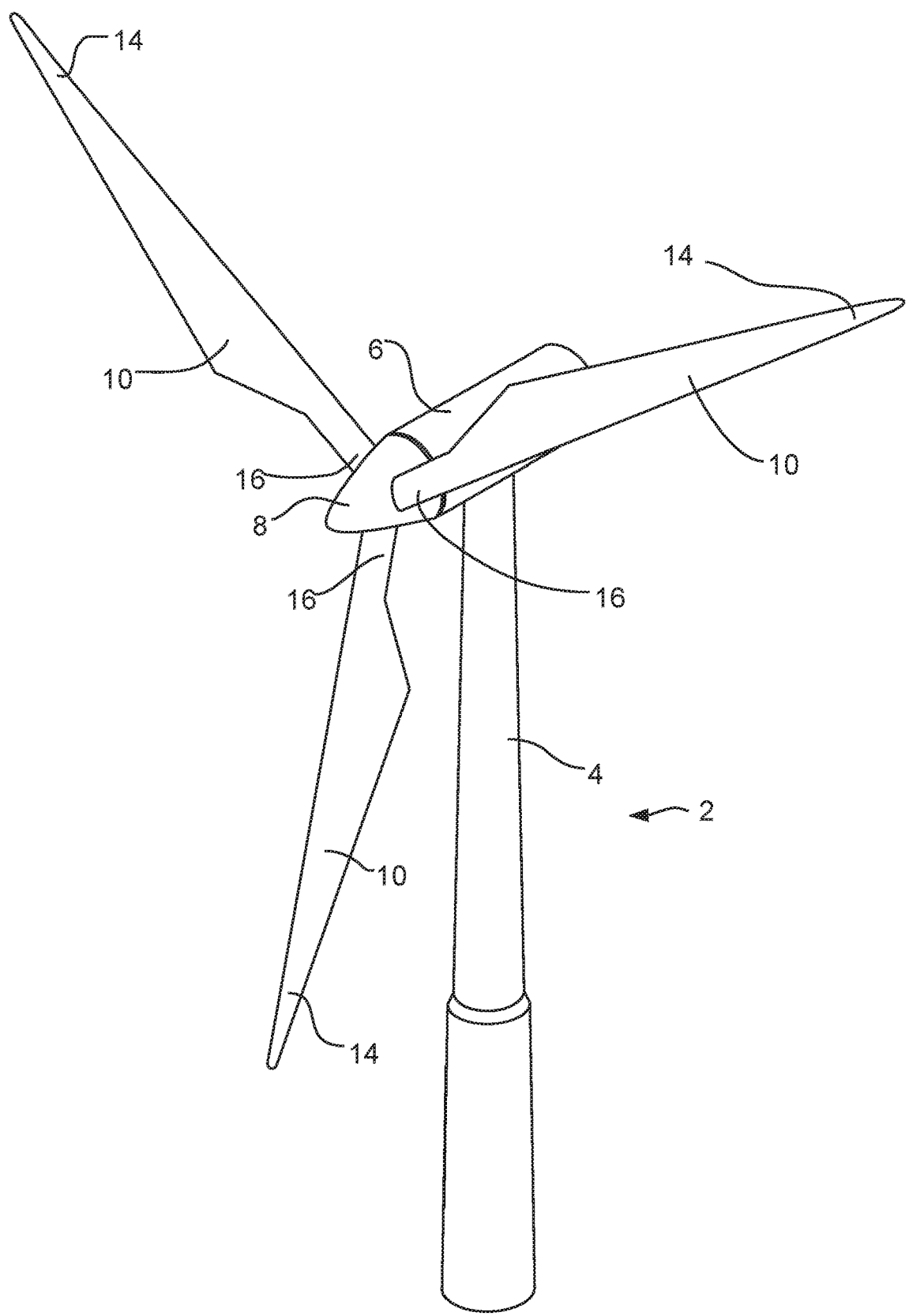
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
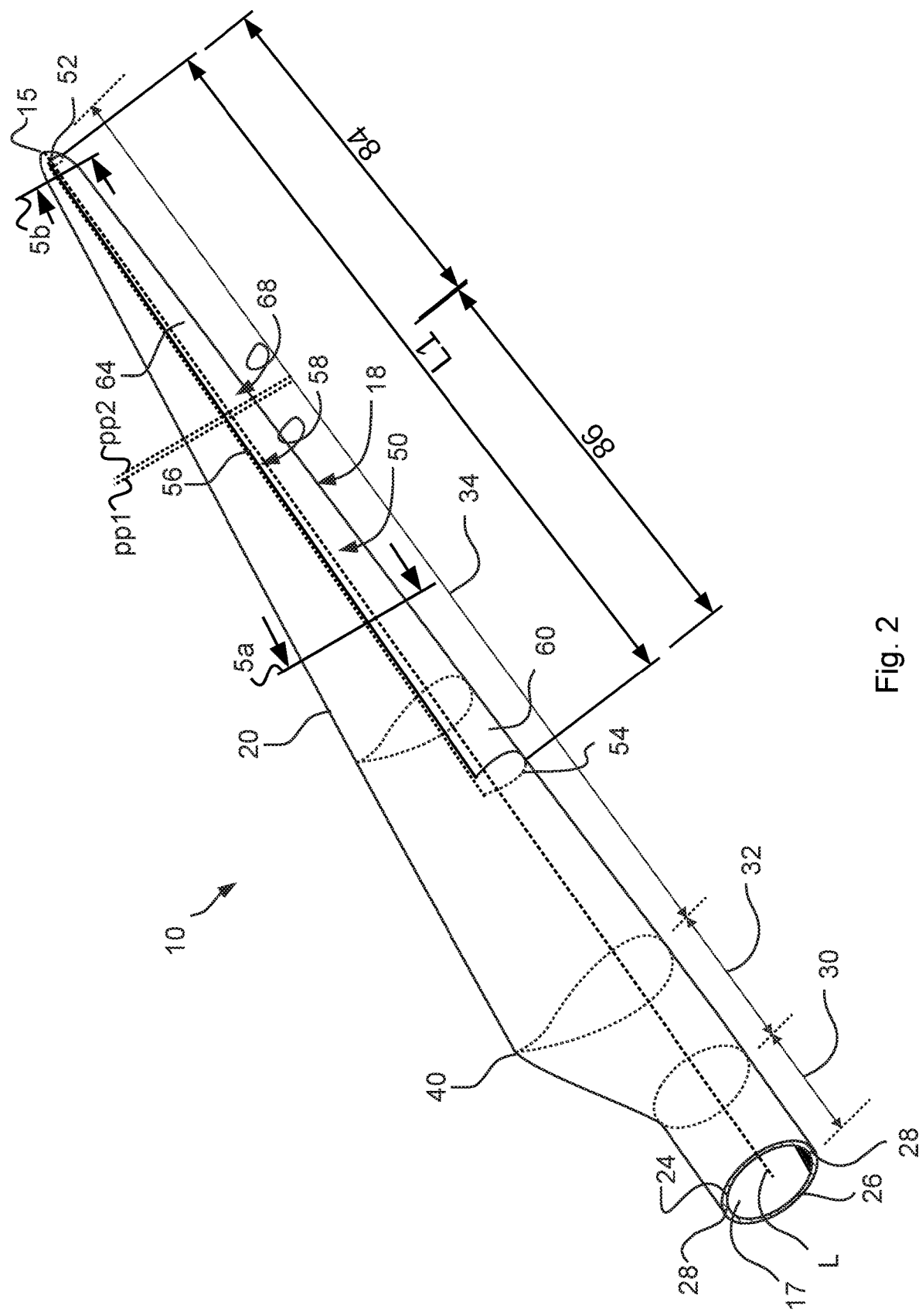
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating maximum lift at minimum drag for a particular wind speed and rotational speed range, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are casted or welded together, or fastened together mechanically or chemically by an adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 comprises a leading edge protection element 50 on the leading edge 18 of the wind turbine blade 10. The leading edge protection element extends in a longitudinal direction between an outboard end 52 and an inboard end 54 and extends in a transverse direction between a first transverse end 56 and a second transverse end 58. The leading edge protection element 50 comprises a first section 64 extending from the leading edge 18 and along a part of the pressure side 24 of the wind turbine blade 10 to the first transverse end 56. The leading edge protection element 50 comprises a second section 68 extending from the leading edge 18 and along a part of the suction side 26 of the wind turbine blade 10 to the second transverse end 58.

The longitudinal direction of the leading edge protection element 50 may be substantially parallel to the longitudinal direction of the wind turbine blade 10. The leading edge protection element L1 may have a length, i.e. the length between the outboard end 52 and the inboard end 54. The length L1 may be smaller than the length of the leading edge 18 of the wind turbine blade 10, such as illustrated. The length L1 may be 100% of the length of the leading edge 18 of the wind turbine blade 10. The length L1 of the leading edge protection element may be between 15-30% of the length of the wind turbine blade. The leading edge protection element 50 has an attachment surface 62 and an exterior surface 60. The attachment surface 62 of the leading edge protection element faces the leading edge 18 of the wind turbine blade. The first transverse end 56 and the second transverse end 58 may extend substantially parallel to the longitudinal direction of the wind turbine blade 10.

The leading edge protection element 50 comprise an inboard portion 86 extending in the longitudinal direction from the inboard end 54 to a primary position pp1. The leading edge protection element 50 comprise an outboard portion 84 extending in the longitudinal direction from the outboard end 52 to a secondary position pp2. The primary position pp1 and the secondary position pp2 may be located at the same position longitudinally or spaced apart, as illustrated. The inboard portion 86 of the leading edge protection element 50 may extend between 2-100% of the length L1 of the leading edge protection element 50. The leading edge protection element 50 is arranged such that the inboard portion 86 of the leading edge protection element is proximal the root end 17 of the wind turbine blade and the outboard portion 84 of the leading edge protection element is proximal the tip end 15 of the wind turbine blade. The extent of the outboard portion 84 and the extent of the inboard portion 86 and the ratio between the two portions as shown in FIG. 2 should not be interpreted as limiting.

Figure 3:
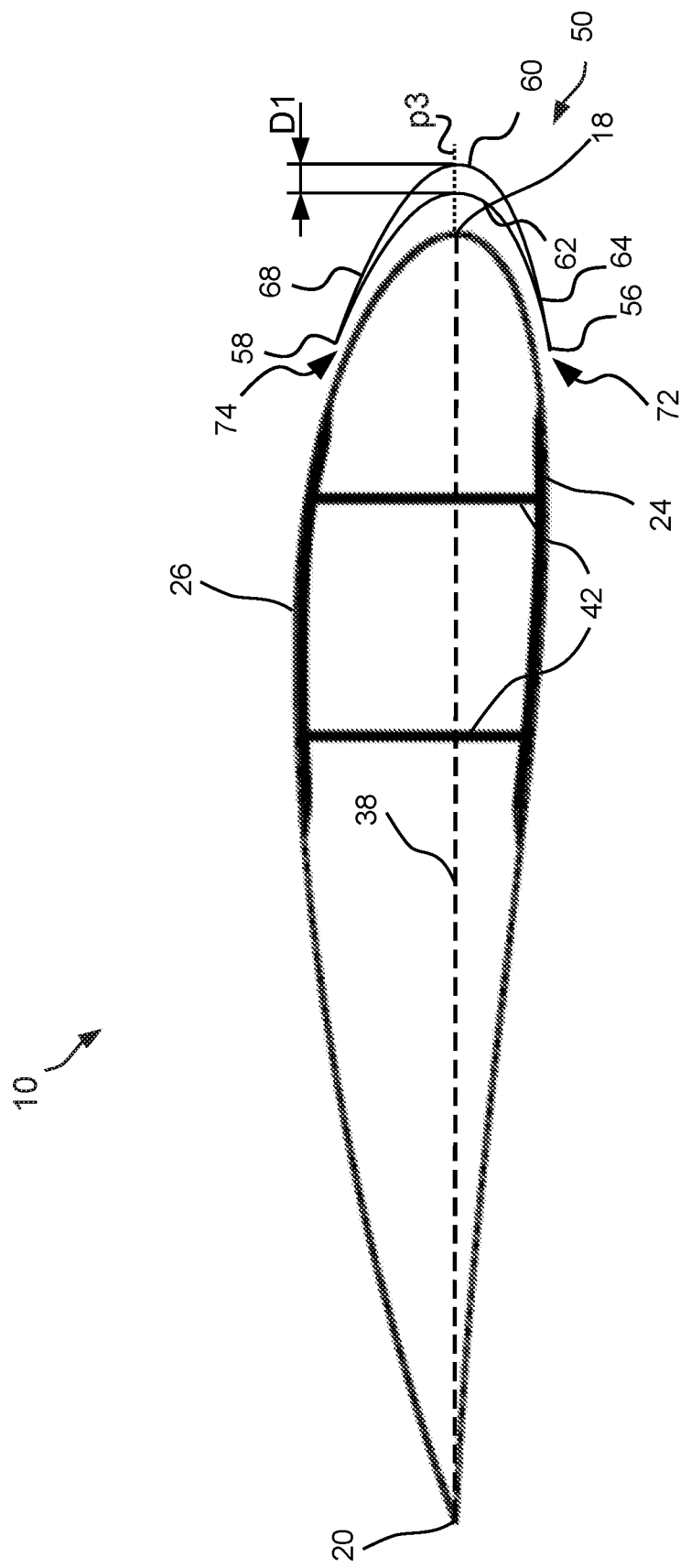
FIG. 3 is a schematic diagram illustrating a sectional view of an exemplary wind turbine blade.

FIG. 3 is a schematic diagram illustrating an exemplary wind turbine blade, e.g. the wind turbine blade 10 of FIGS. 1-2. The wind turbine blade 10 comprises a leading edge 18, a trailing edge 20, a pressure side 24 and a suction side 26. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The shell parts 24, 26 may comprise glass fibres.

The wind turbine blade 10 may be protected by providing a leading edge protection element 50, such as the leading edge protection element 50 of FIG. 2. The leading edge protection element 50 may be attached to the leading edge 18 of the wind turbine blade 10 by orienting the leading edge protection element 50 such that the attachment surface 62 faces the leading edge 18 of the wind turbine blade 10. The leading edge protection element 50 may be attached by applying an adhesive, e.g. a pressure sensitive adhesive or a two component adhesive and/or a heat activated adhesive. The adhesive may be applied on the attachment surface 62 of the leading edge protection element 50 or on the leading edge 18 of the wind turbine blade 10. Alternatively, the leading edge protection element 50 may be mechanically fastened and/or welded onto the wind turbine blade 10. The leading edge protection element 50 may be used in protection of the leading edge of completed wind turbine blades by attaching the leading edge protection element 50 to wind turbine blades coming out of the production or to wind turbine blades already installed in the field. Furthermore, the leading edge protection element 50 may be attached to portions of the leading edge where there is a need for repair of existing leading edge protection elements, e.g., due to flaking or erosion. The location for repair may be prepared, e.g., by sanding, to remove the damaged existing leading edge protection element partly or fully. The leading edge protection element 50 for repair may be attached to cover the leading edge of the blade and alternatively part of the existing leading edge protection element which does not need to be removed.

The leading edge protection element 50 has a thickness D1 at a point p3 on the leading edge 18 of the wind turbine blade 10. The first transverse end 56 and the second transverse end 58 may be chamfered or tapered such that the transition to the airfoil is minimal. For example, an end portion of the first section, e.g. first end portion 72, and/or an end portion of the second section, e.g. second end portion 74 are chamfered. For example, the thickness D1 of the leading edge protection element 50 between the attachment surface 62 and the exterior surface 60 decreases towards the end portions 72, 74. The ratio between the thickness D1 at the end portions 72, 74 and the thickest point of the leading edge protection element 50 may be at least 1:20. The thickness of the end portions 72, 74 may be less than 0.1 mm. The thickness D1 of the leading edge protection element 50 may be constant, such that the ends are not chamfered, as illustrated in FIG. 5.

Figure 4:
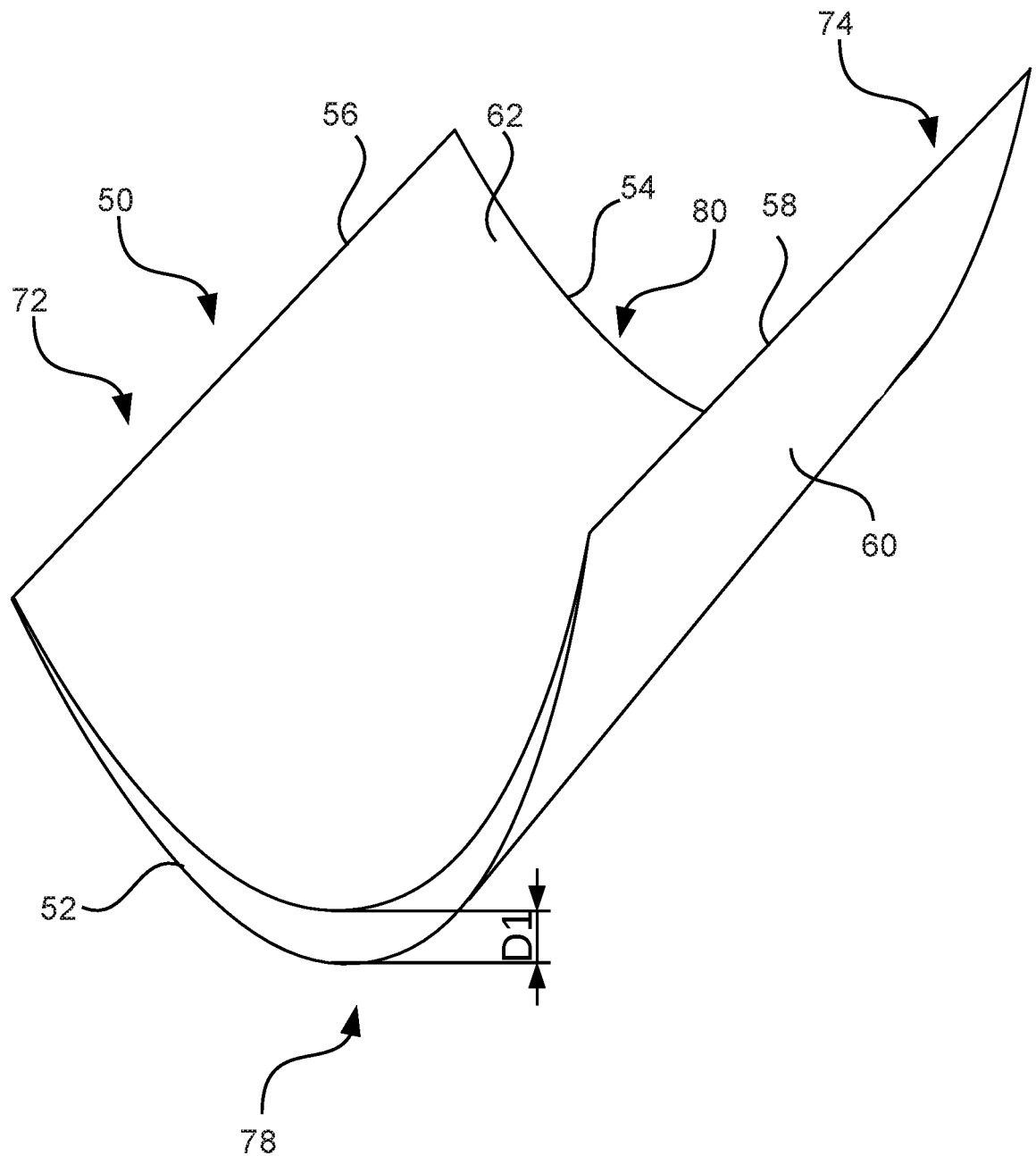
FIG. 4 is a schematic diagram illustrating an exemplary leading edge protection element.

FIG. 4 is a schematic diagram illustrating a leading edge protection element 50, such as the leading edge protection element of FIGS. 2-3. The leading edge protection element 50 extends in a longitudinal direction between an outboard end 52 and an inboard end 54 and in a transverse direction between a first transverse end 56 and a second transverse end 58. The leading edge protection element 50 comprises an attachment surface 62 and an exterior surface 60. The leading edge protection element 50 has a thickness D1, e.g. at the thickest point or at a point on the leading edge of the wind turbine blade when the leading edge protection element 50 is attached.

The first end portion 72 and/or the second end portion 74 may be chamfered in the spanwise direction. Although not illustrated as such, an outboard end portion 78 at the outboard end 52 and/or an inboard end portion 80 at the inboard end 54 may be chamfered. The ratio between the thickness D1 at the end portions 78, 80 and the thickest point of the leading edge protection element 50 may be 1:10. The thickness of the end portions 78, 80 may be around 0.30 mm.

Figure 5A:
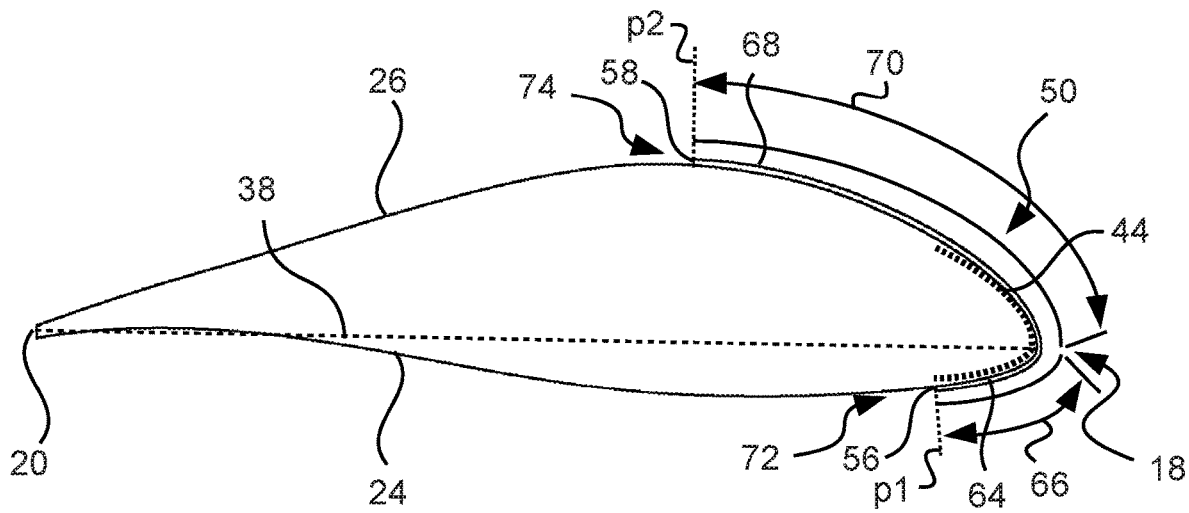
FIGS. 5a-5b are schematic diagrams illustrating a sectional view of an exemplary wind turbine blade.
Figure 5B:
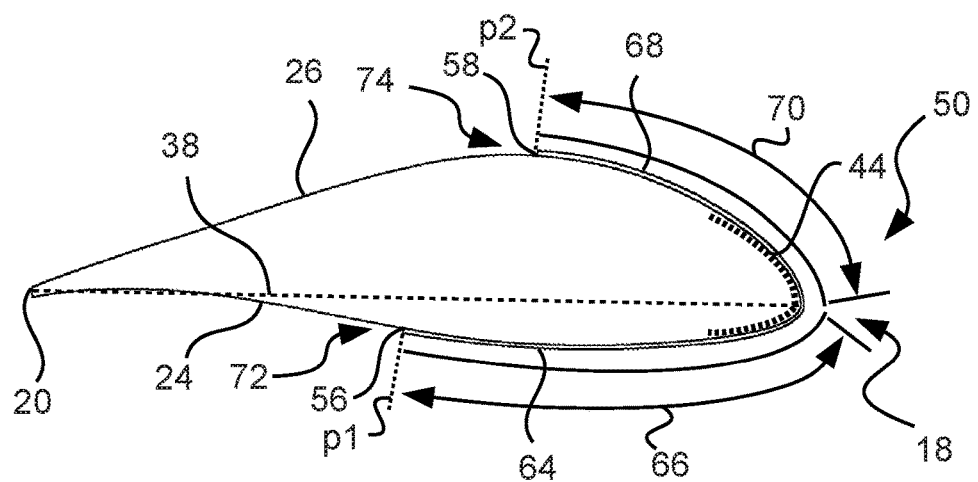

FIGS. 5a-5b are schematic diagrams illustrating a cross sectional view of an exemplary wind turbine blade 10, such as the wind turbine blade 10 of FIGS. 1-3. The wind turbine blade 10 comprises a leading edge 18, a trailing edge 20, a pressure side 24 and a suction side 26. The wind turbine blade 10 comprises a chord line 38 between the leading edge 18 and the trailing edge 20. The wind turbine blade has an erosion sensitive area 44, which is most sensitive to wear and tear over time. The wind turbine blade 10 may be protected by providing a leading edge protection element 50 over the erosion sensitive area 44, such as the leading edge protection element 50 of FIGS. 2-4. FIGS. 5a and 5b illustrates two ways of arranging the leading edge protection element 50 asymmetrically relative to the leading edge 18 of the wind turbine blade 10. The leading edge protection element 50 may be attached to the leading edge 18 of the wind turbine blade 10 by orienting the leading edge protection element 50 such that the attachment surface 62 faces the leading edge 18 of the wind turbine blade 10. The leading edge protection element 50 may be attached by applying an adhesive, e.g. a pressure sensitive adhesive or a two component adhesive and/or a heat activated adhesive. The adhesive may be applied on the attachment surface 62 of the leading edge protection element 50 or on the leading edge 18 of the wind turbine blade 10. Alternatively, the leading edge protection element 50 may be mechanically fastened and/or welded onto the wind turbine blade 10.

The first end portion 72 at the first transverse end 56 and/or the second end portion 74 at the second transverse end 58 may be chamfered or tapered such that the transition from the leading edge protection element 50 to the blade shell parts 24, 26 is reduced.

The leading edge protection element 50 comprises a first section 64 extending from the leading edge 18 and along a part of the pressure side 24 of the wind turbine blade 10 to a first transverse end 56 at a first position p1. The first section 64 has a first extent 66, in the circumferential direction, from the leading edge 18 of the wind turbine blade 10 to the first position p1. The leading edge protection element 50 comprises a second section 68 extending from the leading edge 18 and along a part of the suction side 26 of the wind turbine blade 10 to a second transverse end 58 at a second position p2. The second section 58 has a second extent 70, in the circumferential direction, from the leading edge 18 of the wind turbine blade 10 to the second position p2.

The leading edge protection element 50 may be arranged asymmetrically on the wind turbine blade 10 relative to the leading edge 18. A higher annual energy production may be provided by reducing the drag and increasing the lift of the wind turbine blade by extending the second extent 70 of leading edge protection element 50 on the suction side 26 and thus postponing the transition from laminar to turbulent flow of the boundary layer in flow direction on the suction side 26. Thus, the position p2 is located at a location where a transition from laminar to turbulent flow of the boundary layer provides the optimal lift and drag. This point may be dependent on the type of blade and its geometry.

FIG. 5a illustrates a cross sectional view of the wind turbine blade 10, e.g. at the inboard portion 86 as illustrated in FIG. 2, e.g. proximal the root. Instead of a symmetrical arrangement of the leading edge protection element 50 relative to the leading edge 18 of the wind turbine blade 10 the leading edge protection element 50 is arranged asymmetrically. The second extent 70 is larger than the first extent 66 along the inboard portion 86 of the leading edge protection element 50.

The first position p1 and the second position p2 are located beyond the boundary of the erosion sensitive area 44. The leading edge protection element 50 may be arranged such that at least the erosion sensitive area 44 on the pressure side 24 is covered by the first extent 66, and such that the remainder of the leading edge protection element 50 is arranged across the suction side 26 and extending to at least the optimal location of where a transition from laminar to turbulent flow of the boundary layer provides the optimal lift and drag.

FIG. 5b illustrates a cross sectional view of the wind turbine blade 10, e.g. at the outboard portion 84 as illustrated in FIG. 2, e.g. proximal the tip. The second extent 70 is smaller than the first extent 66 along the outboard portion 84 of the leading edge protection element 50. The first position p1 is located at the boundary of the erosion sensitive area 44 and the second position p2 is located beyond the boundary of the erosion sensitive area 44. The leading edge protection element 50 may be arranged such that at least the erosion sensitive area 44 on the pressure side 24 is covered by the first extent 66, and such that the remainder of the leading edge protection element 50 is arranged across the suction side 26. The second extent 70 may also be smaller than the first extent 66 along an inboard portion 86 of the leading edge protection element 50.

The location of the first position p1 and second position p2 according to FIGS. 5a-5b should not be interpreted to be limiting. For example, the location of the first position p1 and second position p2 in FIG. 5b may be at the boundary of the erosion sensitive area 44. The leading edge protection element 50 may be arranged such that the second extent 70 extents to at least the optimal location of where a transition from laminar to turbulent flow of the boundary layer provides the optimal lift and drag for the suction side 26, and such that the remainder of the leading edge protection element 50 is arranged across the pressure side 24 and extending to at least the boundary of the erosion zone 44.

The transition between the outboard portion 84 and the inboard portion 86 may be smooth. For example, the second extent 70 at the outboard end 52 of the inboard portion 86 may be the same as the second extent 70 at the inboard end 54 of the outboard portion 84. The first extent 66 at the outboard end 52 of the inboard portion 86 may be the same as the first extent 66 at the inboard end 54 of the outboard portion 84.

Alternatively, the transition between the outboard portion 84 and the inboard portion 86 may be rounded or be sharp, hard, jagged or jump in discrete intervals. For example, the second extent 70 at the outboard end 52 of the inboard portion 86 may be different than the second extent 70 at the inboard end 54 of the outboard portion 84. The first extent 66 at the outboard end 54 of the inboard portion 86 may be different than the first extent 66 at the inboard end 54 of the outboard portion 84.

Figure 6A:
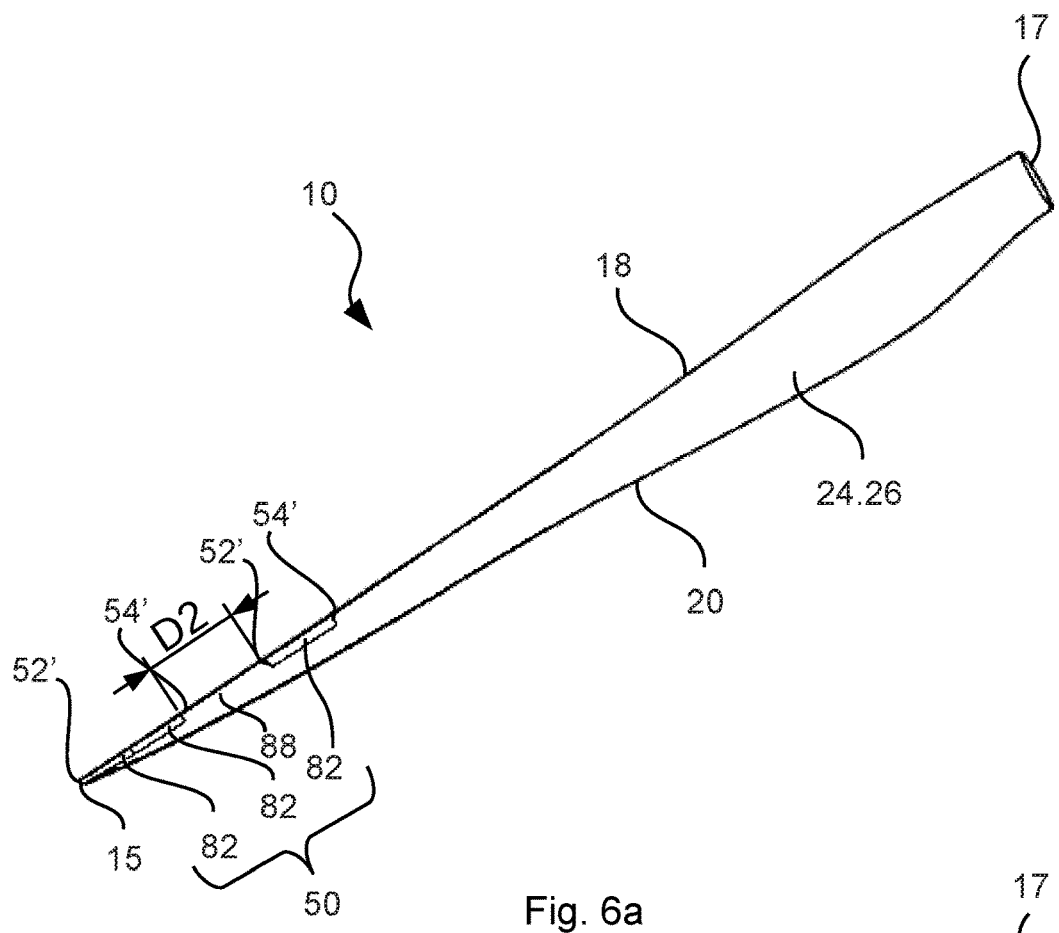
FIGS. 6a-6b are schematic diagrams illustrating an exemplary wind turbine blade.
Figure 6B:
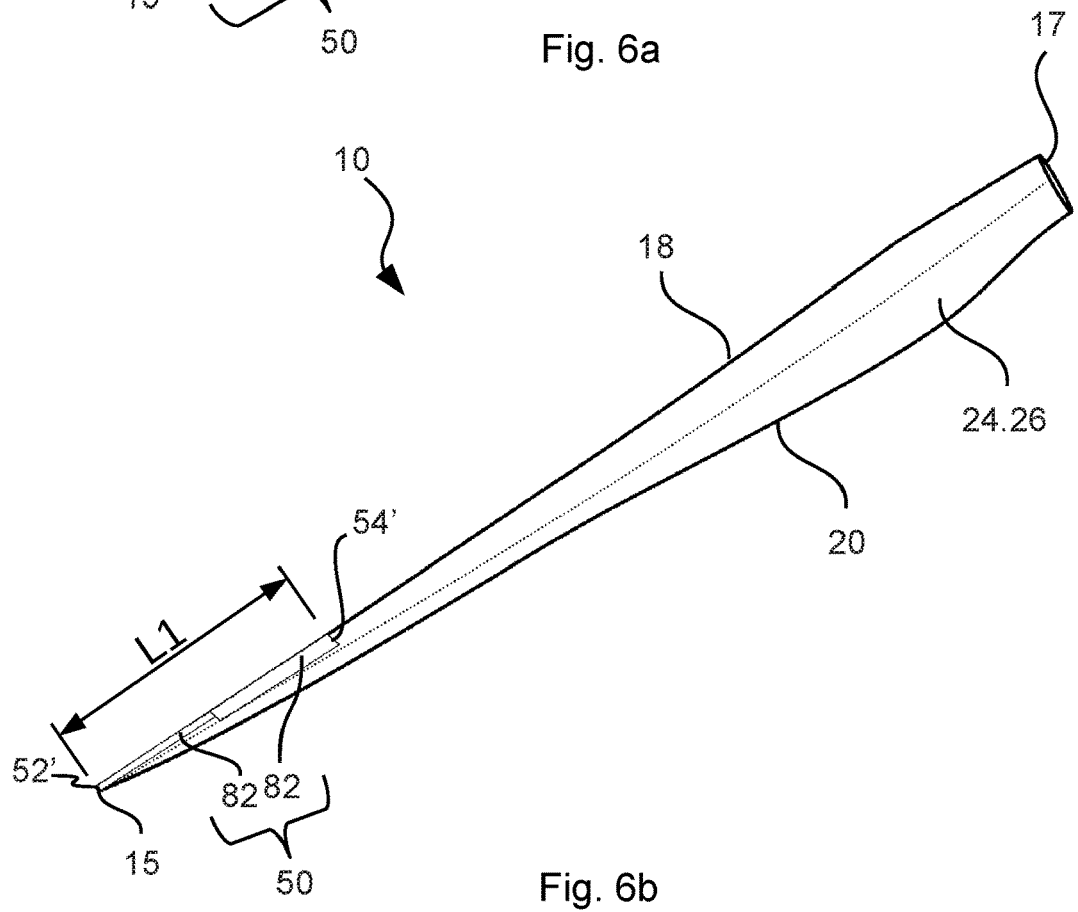

FIGS. 6a-6b are schematic diagrams illustrating a wind turbine blade, such as the wind turbine blades of the previous figures. The wind turbine blade 10 comprises a leading edge protection element 50, such as the leading edge protection element of FIGS. 2-5, attached to the leading edge 18. The leading edge protection element 50 may be divided into a plurality of parts 82 of variable lengths, widths and planform shapes extending along separate longitudinal parts of the wind turbine blade 10. The plurality of parts 82 may abut one another, or the parts 82 may be separated by an intermediate area 88 with a longitudinal length D2. The intermediate area 88 may not be covered with a part 82 of leading edge protection element 50. The length D2 may be large, e.g. have a longitudinal length corresponding to the longitudinal length of a part 82 or a length larger than the longitudinal length of a part 82. The length D2 may be small, e.g. have a longitudinal length of around 20 mm.

The plurality of parts 82 of the leading edge protection element 50 may have a rounded outboard end 52' and a rounded inboard end 54' with a minimum radius of around 8 mm. The length D2, e.g. the intermediate area 88, may be covered by butt-straps (not shown), such as adhesive butt-straps. The butt-straps may extend across the intermediate area 88, e.g. having a width corresponding to at least the length D2, and extend over the parts with for example 20 mm.

Figure 7A:
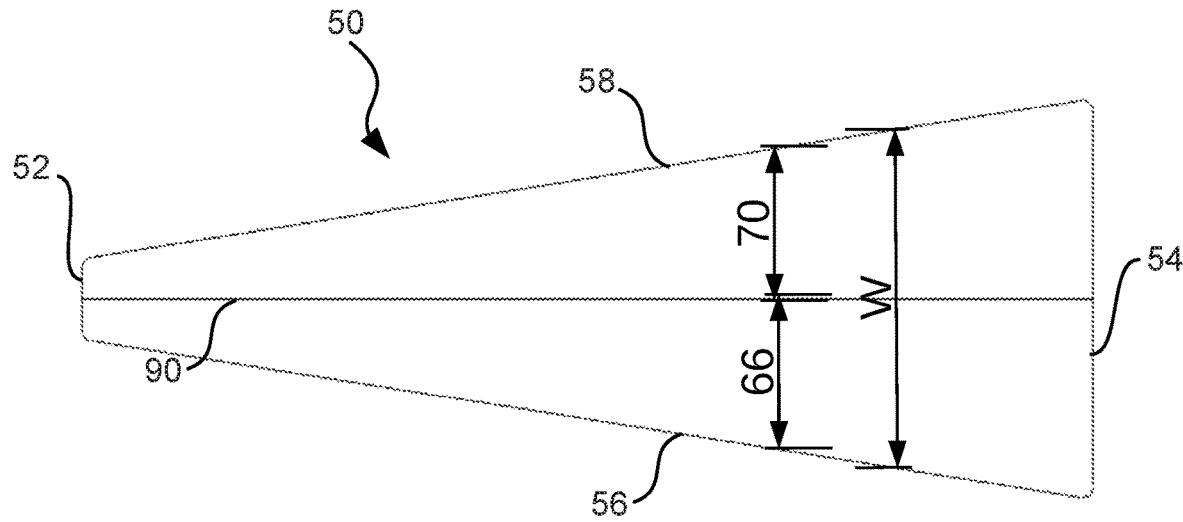
FIGS. 7a-7b are schematic diagrams illustrating an leading edge protection element.
Figure 7B:
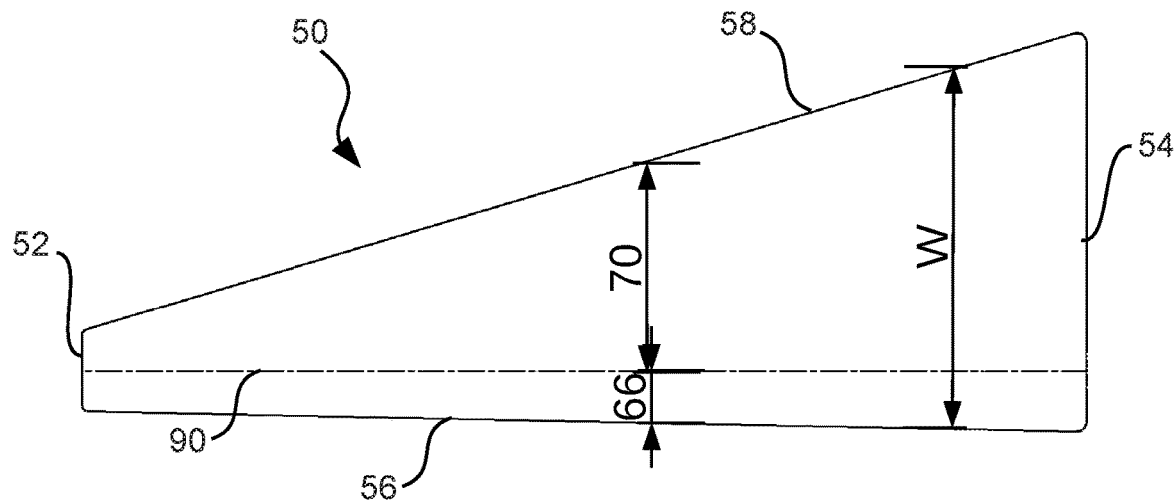

FIGS. 7a-7b are schematic diagrams illustrating an exemplary leading edge protection element 50, e.g., an outboard portion 84 of the leading edge protection element 50 of the previous figures.

The leading edge protection element 50, e.g. the outboard portion 84, may be triangular, as illustrated in FIG. 7a or trapezoidal as illustrated in FIG. 7b.

The leading edge protection element 50 may be attached to a blade such that the leading edge line 90 is aligned with the leading edge of the blade and such that the first transverse end 56 extends along the pressure side of the blade. Alternatively, the leading edge protection element may be attached to a blade such that the leading edge line 90 is aligned with the leading edge of the blade and such that the first transverse end 56 extends along the suction side of the blade. The leading edge protection element 50 has a width in the transverse direction between the first transverse end 56 and the second transverse end 58.

The second extent 70 may be larger than the first extent 66 along at least an inboard portion of the leading edge protection element. The second extent 70 may smaller than the first extent 66 along at least an outboard portion of the leading edge protection element.

Figure 8:
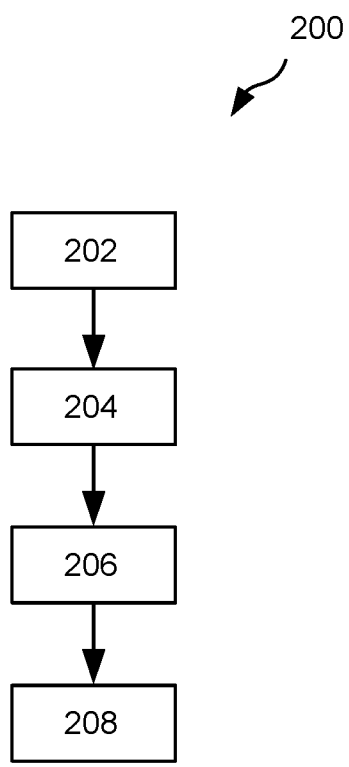
FIG. 8 is a block diagram of an exemplary method.

FIG. 8 is a block diagram of an exemplary method 200 for protecting a wind turbine blade, e.g. protecting the leading edge of the wind turbine blade.

The method 200 comprises providing 202 a wind turbine blade, such as the wind turbine blade of the previous figures. The wind turbine blade may be a new wind turbine blade or a wind turbine blade for refurbishing or repair.

The method 200 comprises providing 204 a leading edge protection element, such as the leading edge protection element of the previous figures.

The method 200 comprises attaching 206 the leading edge protection element to the wind turbine blade, e.g. such that the leading edge protection element is attached to wind turbine blade as described for the previous figures.

The method 200 may comprise joining the leading edge protection element and the wind turbine blade by the use of an adhesive, e.g. by applying an adhesive on the attachment surface of the leading edge protection element or on the wind turbine blade.

The method 200 may comprise attaching 208 the leading edge protection element such that the outboard end of the leading edge protection element is proximate the tip of the wind turbine blade.

LIST OF REFERENCES 2 wind turbine
4 tower
6 nacelle
8 hub
10 blade
12 blade part
14 blade tip
15 tip end
16 blade root
17 root end
18 leading edge
20 trailing edge
24 first blade shell part (pressure side)
26 second blade shell part (suction side)
28 bond lines/glue joints/fastening joints/welding joints/casting mould split lines
30 root region
32 transition region
34 airfoil region
40 shoulder
42 shear web or spar side
44 erosion sensitive area
50 leading edge protection element
52 outboard end
52' outboard end of part
54 inboard end
54' inboard end of part
56 first transverse end
58 second transverse end
60 exterior surface
62 attachment surface
64 first section
66 first extent
68 second section
70 second extent
72 first end portion
74 second end portion
76 secondary surface
78 outboard end portion
80 inboard end portion
82 leading edge protection element parts
84 outboard portion
86 inboard portion
88 intermediate area
90 leading edge line
L longitudinal axis
L1 length
W width
p1 first position
p2 second position
p3 third position
pp1 primary position
pp2 secondary position
D1 thickness
D2 longitudinal length
200 method
202 providing wind turbine blade
204 providing leading edge protection element
206 attaching leading edge protection element
208 attaching leading edge protection element

The invention claimed is:

1. A wind turbine blade extending from a root to a tip, the wind turbine blade comprising a root region, and an airfoil region comprising the tip, a pressure side, a suction side and a chord line extending between a leading edge and a trailing edge, the wind turbine blade comprising a leading edge protection element attached to the leading edge of the wind turbine blade, the leading edge protection element extending in a longitudinal direction and having a length between an outboard end and an inboard end and comprising:
an attachment surface mounted to an exterior surface of the blade,
an exterior surface opposite the attachment surface,
a first section extending from the leading edge and along a part of the pressure side of the wind turbine blade to a first transverse end at a first position on the pressure side of the blade, the first section having a first extent from the leading edge of the wind turbine blade to the first position on the pressure side of the blade, and
a second section extending from the leading edge and along a part of the suction side of the wind turbine blade to a second transverse end at a second position on the suction side of the blade, the second section having a second extent from the leading edge of the wind turbine blade to the second position on the suction side of the blade,
wherein the second extent is larger than the first extent along at least an inboard portion of the leading edge protection element, and
wherein the second extent is smaller than the first extent along at least an outboard portion of the leading edge protection element.

2. The wind turbine blade according to claim 1, wherein the ratio between the first extent and the second extent is between 1:3-1:6.

3. The wind turbine blade according to claim 1, wherein the inboard portion of the leading edge protection element extends in a longitudinal direction between 2-100% of the length of the leading edge protection element.

4. The wind turbine blade according to claim 1, wherein the second section extends along at least 20% of the chord line of the wind turbine blade along at least the inboard portion of the leading edge protection element.

5. The wind turbine blade according to claim 1, wherein the first section extends along at least 5% of the chord line of the wind turbine blade along at least the inboard portion of the leading edge protection element, and/or the first section extends along at least 30% of the chord line of the wind turbine blade along at least the outboard portion of the leading edge protection element.

6. The wind turbine blade according to claim 1, wherein at least one of an end portion of the first section and an end portion of the second section are chamfered, and/or at least one of an end portion at the outboard end and an end portion at the inboard end are chamfered.

7. The wind turbine blade according to claim 1, wherein the outboard end is arranged proximal the tip of the wind turbine blade.

8. The wind turbine blade according to claim 1, wherein the length of the leading edge protection element is between 15-30% of the length of the wind turbine blade.

9. The wind turbine blade according to claim 1, wherein the leading edge protection element is divided into a plurality of parts extending along separate longitudinal parts of the wind turbine blade.

10. The wind turbine blade according to claim 1, wherein the leading edge protection element has a triangular or trapezoidal shape, wherein the width between the first transverse end and the second transverse end increases from the outboard end to the inboard end.

11. The wind turbine blade according to claim 1, wherein the transition from an outboard configuration at an outboard portion of the leading edge protection element to an inboard configuration at an inboard portion of the leading edge protection element is gradual or smooth, or jumps in discrete intervals.

12. A method for protecting a leading edge of a wind turbine blade, wherein the wind turbine blade extends from a root to a tip, and comprising a root region, and an airfoil region comprising the tip, a pressure side, a suction side and a chord line extending between the leading edge and a trailing edge,
the method comprising:
providing a wind turbine blade,
providing a leading edge protection element, the leading edge protection element extending in a longitudinal direction and having a length between an outboard end and an inboard end and comprising:
an attachment surface mounted to an exterior surface of the blade,
an exterior surface opposite the attachment surface,
a first section configured to extend from the leading edge and along a part of the pressure side of the wind turbine blade to a first transverse end at a first position on the pressure side of the blade, and
a second section configured to extend from the leading edge and along a part of the suction side of the wind turbine blade to a second transverse end at a second position on the suction side of the blade,
attaching the leading edge protection element to the wind turbine blade such that the first section has a first extent from the leading edge of the wind turbine blade to the first position on the pressure side of the blade and such that the second section has a second extent from the leading edge of the wind turbine blade to the second position on the suction side of the blade,
wherein the second extent is larger than the first extent along at least an inboard portion of the leading edge protection element, and
wherein the second extent is smaller than the first extent along at least an outboard portion of the leading edge protection element.

13. The method according to claim 12, wherein the leading edge protection element is attached such that the outboard end of the leading edge protection element is proximate the tip of the wind turbine blade.

14. A leading edge protection element for a wind turbine blade extending in a longitudinal direction and having a length between an outboard end and an inboard end and comprising:
an attachment surface configured to be mounted to an exterior surface of a wind turbine blade,
a first section extending from a leading edge line to a first transverse end and having a first extent from the leading edge line to the first transverse send, the leading edge line being configured to be aligned with a leading edge of the blade, the first section being configured to extend along a part of a pressure side of the blade and the first transverse end being configured to be aligned with a first position on the pressure side of the blade, and
a second section extending from the leading edge line to a second transverse end and having a second extent from the leading edge line to the second transverse send, the second section being configured to extend along a part of a suction side of the blade, the second transverse end being configured to be aligned with a second position on the suction side of the blade, wherein the second extent is larger than the first extent along at least an inboard portion of the leading edge protection element, and wherein the second extent is smaller than the first extent along at least an outboard portion of the leading edge protection element.

15. The leading edge protection element according to claim 14, wherein the ratio between the first extent and the second extent is between 1:3-1:6.

16. The leading edge protection element according to claim 14, wherein the inboard portion of the leading edge protection element extends in a longitudinal direction between 2-100% of the length of the leading edge protection element.

17. The leading edge protection element according to claim 14, wherein the leading edge protection element has a triangular or trapezoidal shape, wherein the width between the first transverse end and the second transverse end increases from the outboard end to the inboard end.

18. The leading edge protection element according to claim 14, wherein the transition from an outboard configuration at an outboard portion of the leading edge protection element to an inboard configuration at an inboard portion of the leading edge protection element is gradual or smooth, or jumps in discrete intervals.

* * * * *